(12) United States Patent
Kida (10) Patent No.: US 6,307,579 B1
(45) Date of Patent: Oct. 23, 2001

(54) MAGNIFICATION ERROR CORRECTION METHOD FOR IMAGE FORMING APPARATUS

(75) Inventor: Akihiko Kida, Zama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/519,587

(22) Filed: Mar. 6, 2000

(51) Int. Cl.$^7$ .............................. B41J 2/385; G03G 13/04
(52) U.S. Cl. .............................................. 347/133; 347/261
(58) Field of Search ................................... 399/31, 32, 51, 399/196, 198, 200, 208; 347/129, 131, 133, 247, 229, 260, 261; 358/448, 451, 454

(56) References Cited

U.S. PATENT DOCUMENTS

| | | | |
|---|---|---|---|
| 4,796,054 | * | 1/1989 | Maeno et al. ........................ 399/200 |
| 5,418,603 | * | 5/1995 | Kusumoto et al. ................ 399/32 X |
| 5,530,642 | * | 6/1996 | Lofthus et al. .................. 347/261 X |
| 5,740,505 | | 4/1998 | Kusumoto et al. .................. 399/200 |
| 6,104,420 | * | 8/2000 | Matsumoto ........................ 347/133 |

FOREIGN PATENT DOCUMENTS 9-130582   5/1997   (JP) .

\* cited by examiner

*Primary Examiner*—Sandra Brase
(74) *Attorney, Agent, or Firm*—Foley & Lardner (57) ABSTRACT

A first polygonal motor correction value and a first drum motor correction value are provided to the polygonal motor and the photosensitive drum motor so that an image formed by a printer unit has a 100% magnification on the basis of data provided from a reference pattern generating unit which generates an ideal pattern data having no magnification error. Next, a document, on which a predetermined pattern is printed, is scanned by a scanner unit, and then, a second polygonal motor correction value and a carriage motor correction value are provided to the polygonal motor and the carriage motor so that an image printed using the printer unit has a 100% magnification. In the case of forming an image by the printer unit in a state that a main scanning/feed direction of the scanned image is inverted, an image is formed using the first polygonal motor correction value, the carriage motor correction value and a second drum motor correction value calculated from the first and second polygonal motor correction values and the first drum motor correction value.

8 Claims, 6 Drawing Sheets

MAGNIFICATION ERROR CORRECTION METHOD FOR IMAGE FORMING APPARATUS

BACKGROUND OF THE INVENTION

In an image forming apparatus, when taking a 100% (life-size) copy, an image copied on a paper must be realized at a 100% magnification with respect to a document. However, a paper feeding speed and a drum circumferential speed coincide with each other due to a part dispersion of a carrier system, that is, a roller outer-diameter and a fixing roller outer-diameter; for this reason, a magnification error takes place. Moreover, in the case where there is no coincidence in a speed of each unit due to dispersion between oscillators of each motor control circuit, a magnification error takes place. Therefore, in the conventional image forming apparatus, the above 100% magnification is not always realized, and in order to realize the 100% magnification, a part accuracy of each unit must be strictly set, and a correction (adjustment) must be made while recognizing an actual copied image.

In a printer unit of a digital copying machine, a magnification error in its main scanning and feed has been corrected by varying a rotational speed of a polygonal motor and a rotational speed of a photosensitive drum motor (a paper feeding speed and a rotational speed of a photosensitive drum). On the other hand, in a scanner unit, a magnification error in its main scanning and feed has been corrected by varying a rotational speed of a polygonal motor and a scanner speed after a correction on the magnification error of the printer unit is made.

Inherently, in the case of making a correction on a magnification error in a main scanning direction, a lens position of a scanner unit and/or printer unit must be adjusted on the basis of an output signal of a CCD. However, an adjustment of a lens system is very troublesome; for this reason, the magnification error is corrected by a rotational speed of the polygonal motor. Moreover, although it is possible to correct the magnification error in a main scanning direction by image processing, this correction is not employed because there is the case where a disadvantage such as "moire" takes place.

According to the conventional magnification error correction in the main scanning/feed direction, in the case of an electronic sort using no finisher (in the case of image rotation), or in the case where a paper set in a transverse direction is run short out of a paper tray; for this reason, the paper tray is changed over from a paper try in which a paper is set in a longitudinal direction, the main scanning/feed direction in reading is replaced with a feed/main scanning direction in writing; as a result, a magnification error takes place. In order to reduce this magnification error, Jpn. Pat. Appln. KOKAI Publication No. 9-130582 has disclosed a method for correcting a magnification error in a longitudinal-transverse conversion. However, according to this method, in addition to magnification error correction in the feed and main scanning direction, each magnification error in a case of longitudinal-transverse conversion must be corrected.

BRIEF SUMMARY OF THE INVENTION

It is, therefore, an object of the present invention to provide a magnification error correction method for an image forming apparatus, which has no need of troublesome processing in correction for an image magnification error in the case of scanning a document and copying it, in addition to in the case of inputting a data from an external device and forming an image using only printer unit, and in the case of scanning the document by a scanner unit, and converting an image main scanning/feed direction so as to form an image by a printer unit.

In order to achieve the above object, according to one aspect of the present invention, there is provided a magnification error correction method comprising the steps of: a first correction step of providing a first polygonal motor correction value and a first drum motor correction value to the polygonal motor and the photosensitive drum motor so that an image formed by the printer unit has a desired magnification, on the basis of the reference pattern data provided from the reference pattern generating unit, and storing these correction values in the memory; and a second correction step of scanning a document, on which a predetermined pattern is printed, by the scanner unit, providing a second polygonal motor correction value and a carriage motor correction value to the polygonal motor and the carriage motor so that an image printed using the printer unit has a desired magnification, storing these correction values in the memory, and providing the drum motor correction value to the photosensitive drum motor.

In the case of inputting an image data from an external device, and forming an image by the printer unit, the image is formed using the first polygonal motor and drum motor correction values.

In the case of scanning the document by the scanner unit, and inverting the image main scanning and feed direction to form the image by the printer unit, the image is formed using the first polygonal motor and carriage motor correction values and the second drum motor correction value calculated by using the first and second polygonal motor correction values and the first drum motor correction value.

The first and second polygonal motor correction values are change rates of the rotational speeds of the polygonal motor after the first and second correction steps are respectively completed with respect to the initial value of the rotational speed of the polygonal motor. The second drum motor correction value is a value calculated by subtracting a difference, obtained by subtracting the second polygonal motor correction value from the first polygonal motor correction value, from the first polygonal motor correction value.

DETAILED DESCRIPTION OF THE INVENTION

A magnification error correction method for an image forming apparatus according to the present invention will be described below with reference to the accompanying drawings.

Figure 1:
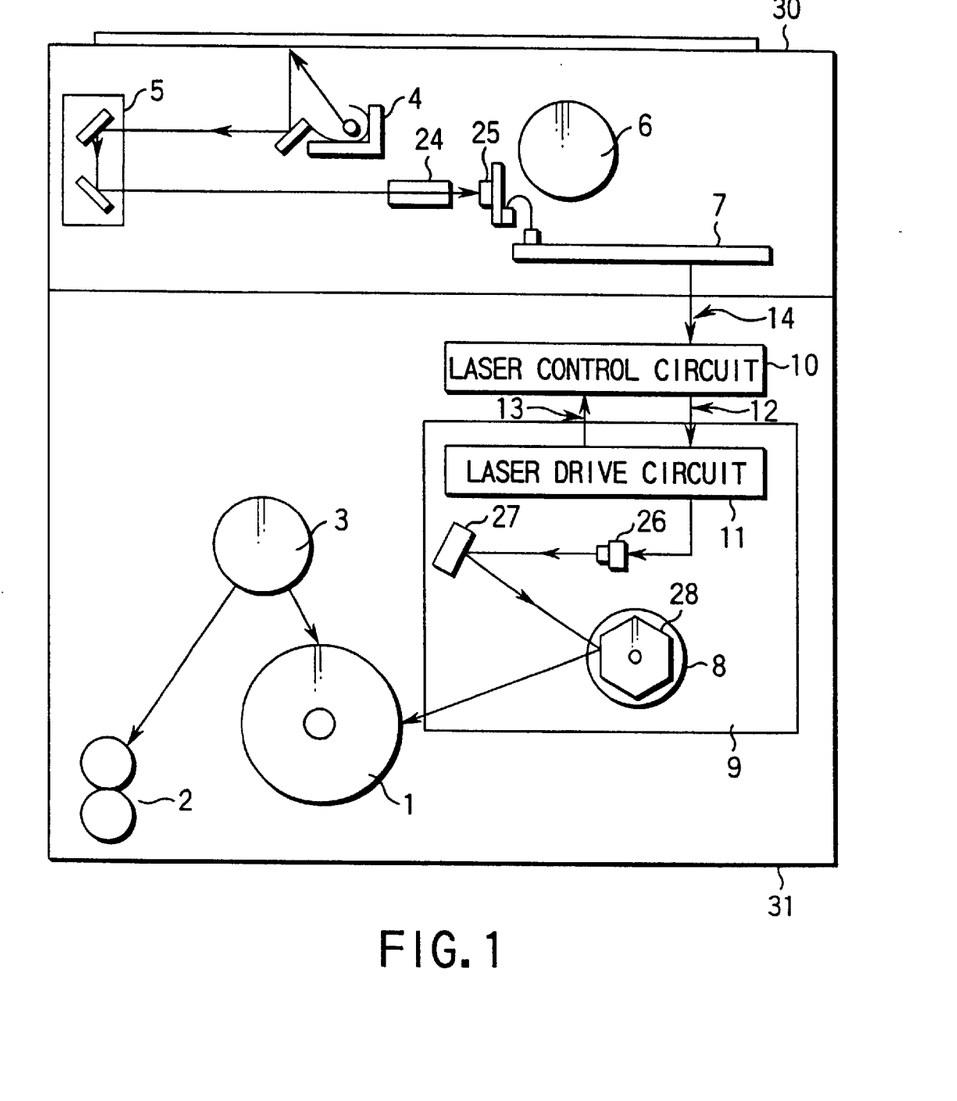
FIG. 1 is a diagram schematically showing a structure of an image forming apparatus to which the present invention is applied.

FIG. 1 is a view schematically showing a structure of an image forming apparatus to which the present invention is applied. As shown in FIG. 1, the image forming apparatus is composed of a scanner unit 30 and a printer unit 31. The scanner units 30 includes first carriage 4 and second carriage 5 for document scanning, a carriage motor 6, a lens 24, a CCD line sensor 25, and a reference pattern generating unit 7. On the other hand, the printer unit 31 includes a laser control circuit 10, a laser drive circuit 11, a semiconductor laser 26, a reflecting mirror 27, a polygonal mirror 28, a polygonal motor 8, a photosensitive drum 1, a photosensitive drum motor 3, and a fuser 2.

Figure 2:
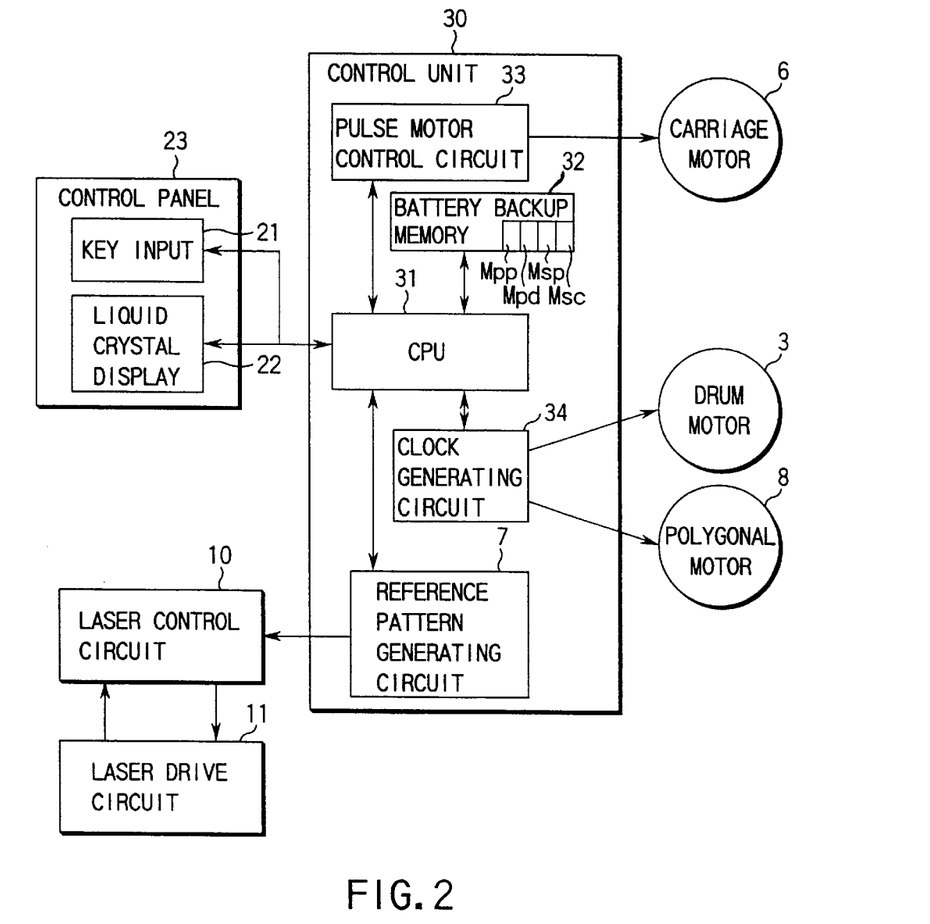
FIG. 2 is a block diagram showing a control system of the image forming apparatus shown in FIG. 1.

FIG. 2 is a block diagram showing a control system of the image forming apparatus shown in FIG. 1. A control system 30 includes a pulse motor control circuit 33, a memory 32, a clock generating circuit 34, a reference pattern generating circuit 7 and a CPU 31 which synthetically controls the image forming apparatus. The memory 32 is backed up by a battery or the like, and stores rotational speed correction values of various motors.

In the photosensitive drum motor 3 for driving the photosensitive drum 1 and the fuser 2 shown in FIG. 1 and the polygonal motor for scanning a laser beam on the photosensitive drum, it is possible to vary a rotational speed of these motors by a clock generated by the clock generating circuit 34. The carriage motor 6 drives the first and second carriages 4 and 5 for document scanning to a feed direction, and a feed speed of the carriage motor 6 is changed by varying a pulse rate of a pulse output from a pulse motor control circuit.

A control panel unit 23 includes a key input unit 21 and a liquid crystal panel 22, and according to the control of CPU 31, inputs a data from a user via the key input unit 21, and then, displays the input data and other data by the liquid crystal panel 22.

The laser control circuit 10 supplies a reference pattern data 14 output from the reference pattern generating circuit 7 as a laser light emitting signal 12 to the laser driving circuit 11 on the basis of a synchronizing signal 13 output from a laser unit 9. The laser driving circuit 11 drives a laser so that an optimum laser beam is emitted according to the laser light emitting signal 12 output from the laser control circuit 10.

Next, a magnification error correction method according to the present invention will be described below with reference to FIGS. 3A to 6. The magnification error correction is carried out when assembling a product in a factory or when putting it to a locating place.

Correction on Printer Unit

Figure 3A:
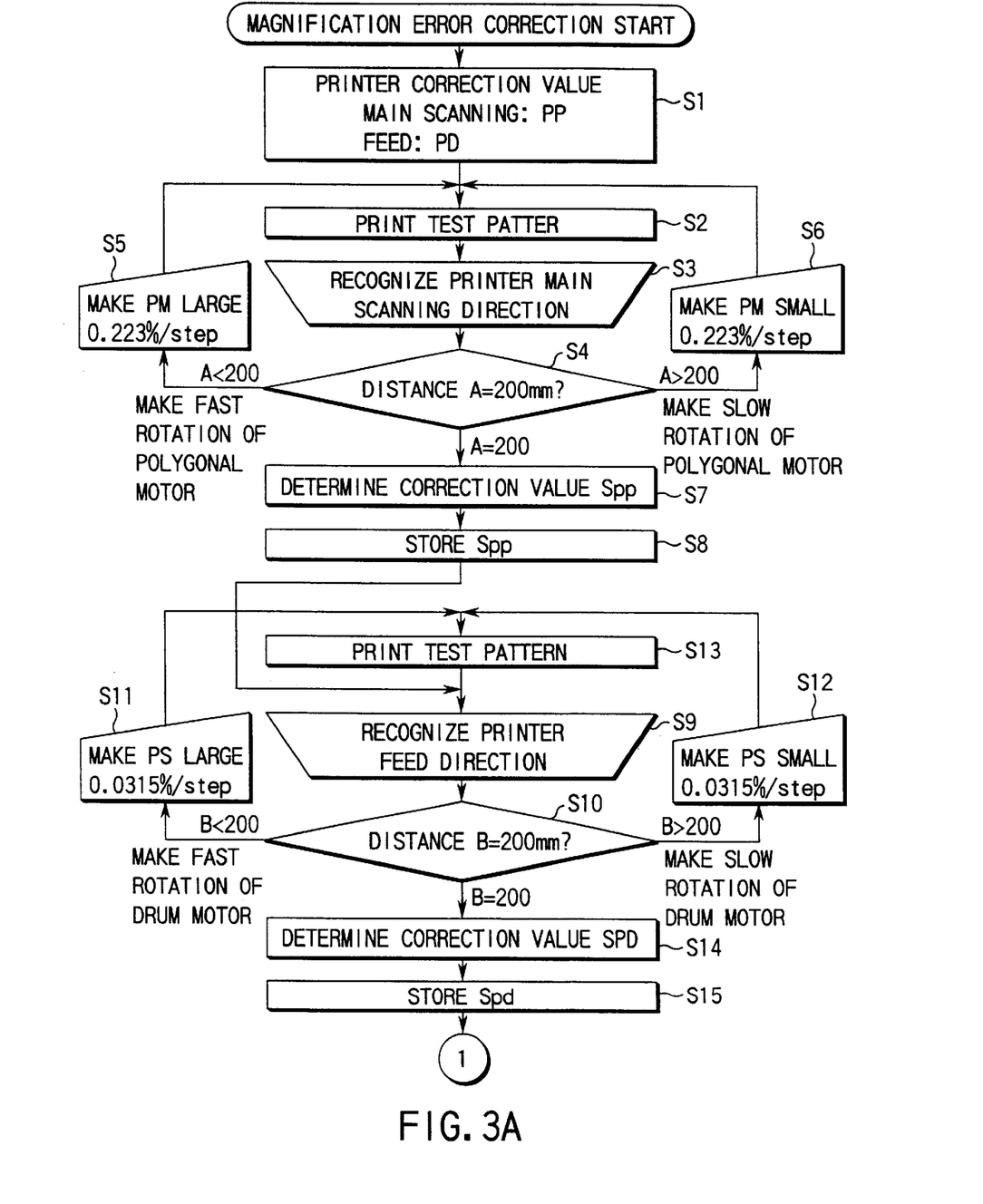
FIGS. 3A and 3B are flowcharts to explain a magnification error correction method according to the present invention.

First, a magnification error relative to only printer unit 31 is suitably corrected. In step S1, a main scanning direction correction is made by correcting a rotational speed PP of the polygonal motor 8, and a feed direction correction is made by changing a rotational speed PD of the photosensitive drum motor 1. In this case, the PP is the rotational speed initial value of the polygonal motor 8, and the PD is the rotational speed initial value of the photosensitive drum motor 1. When changing the rotational speed of the polygonal motor 8, a period of a horizontal synchronizing signal varies; as a result, an image magnification of the feed direction varies. For this reason, a correction of the polygonal motor 8 is carried out before correction of the photosensitive drum motor.

Figure 4:
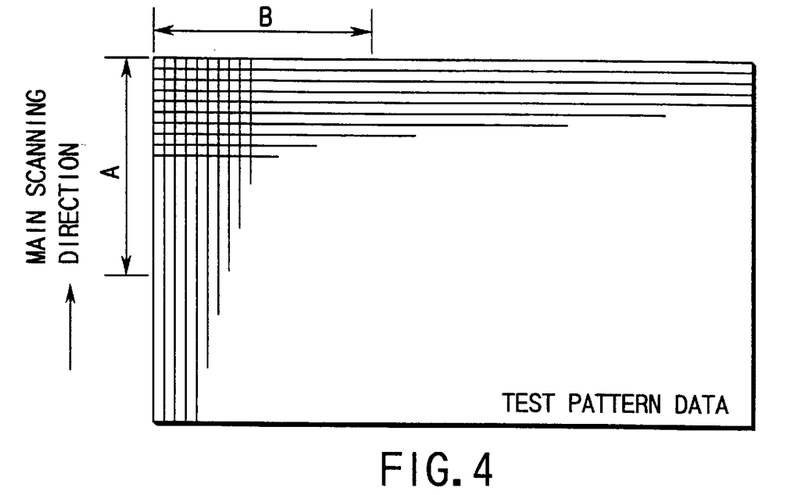
FIG. 4 is a diagram showing test pattern data used in the magnification error correction method according to the present invention.

In step S2, a test pattern data having an accurate 10 mm-pitch lattice as shown in FIG. 4 is generated by the reference pattern generating circuit 7, and then, is printed. The pattern data is a reference data in magnification error correction, and substantially has no magnification error. A main scanning direction length (distance) A of the printed pattern is measured by a scale or the like (step S3), and then, in accordance with an error, a proper correction value is input by the control panel 23 (steps S5 and S6). In this case, a rotational speed of the polygonal motor 8 has a change of 0.223% per correction one step value. In the case where a value of the distance A is smaller than 200 mm, a correction step value is a positive value; on the other hand, in the case where the distance A value is larger than 200 mm, the correction step value is a negative value. In order to simplify the explanation, in this case, "0" is temporarily set as the initial value of the correction value; however, in fact, other values may be used.

The input correction value is stored in an area "Mpp" of the correction value storing memory 32, and then, the polygonal motor 8 is rotated according to a rotational speed corresponding to a new correction value. Further, the 10 mm lattice-like test pattern is again printed and then, is measured by a scale. The steps S4 to S6 are repeated until the error becomes least, and then, a final correction value Spp (step) is obtained, and thereafter, the correction value Spp is overwritten in the area "Mpp" of the correction value storing memory 32 (step S8). The correction value Spp is set as a first polygonal motor correction value.

A change rate Dpp of rotational speed after correction with respect to the rotational speed initial value PP of the polygonal motor is obtained by the following equation (1) using the first polygonal motor correction value Spp.

$$Dpp = 0.233 \times Spp/100 \qquad (1)$$

Thus, the polygonal motor 8 after correction is rotated at a rotational speed PP' obtained by the following equation (2).

$$PP' = PP(1 + Dpp) \qquad (2)$$

Subsequently, a rotational speed of the photosensitive drum motor 3 is corrected. As described above, a feed direction of the printed lattice-like test pattern is recognized using the first polygonal motor correction value Spp and the reference pattern generating circuit 7 (step S9). More specifically, a distance B of the feed direction of the printed lattice-like test pattern is measured by a scale, and then, in accordance with an error, a proper correction value is input using the control panel 23 (steps S11 and S12). In this case, a rotational speed of the drum motor 8 has a change of 0.0315% per correction value one step. In the case where the distance B is smaller than 200 mm, a correction step value is a positive value; on the other hand, in the case where the distance B value is larger than 200 mm, the correction step value is a negative value.

The input correction value is stored in an area "Mpd" of the correction value storing memory 32, and then, the photosensitive drum 1 is rotated according to a rotational speed corresponding to a new correction value. Further, the 10 mm lattice-like test pattern is again printed and then, is measured by a scale. The steps S9 to S13 are repeated until the error becomes least, and then, a final correction value Spd (step) is obtained, and thereafter, the correction value Spp is overwritten in the area "Mpd" of the correction value storing memory 32 (step S8).

Correction on Scanner Unit

Next, a magnification error relative to only scanner unit 30 is properly corrected. In step S20 of FIG. 3B, in the scanner unit 30, only feed direction magnification error is properly corrected by changing a rotational speed of the carriage motor 6. A main scanning direction magnification error is properly corrected according to matching with the printer unit 31. More specifically, a correction on the main scanning direction of the scanner unit 30 is carried out by changing the rotational speed SP of the polygonal motor 8 of the printer unit 31. In this case, the initial value SP of the polygonal motor 8 is PP' shown in the above equation (2), and therefore, the first correction value Spp of the polygonal motor is applied.

Figure 3B:
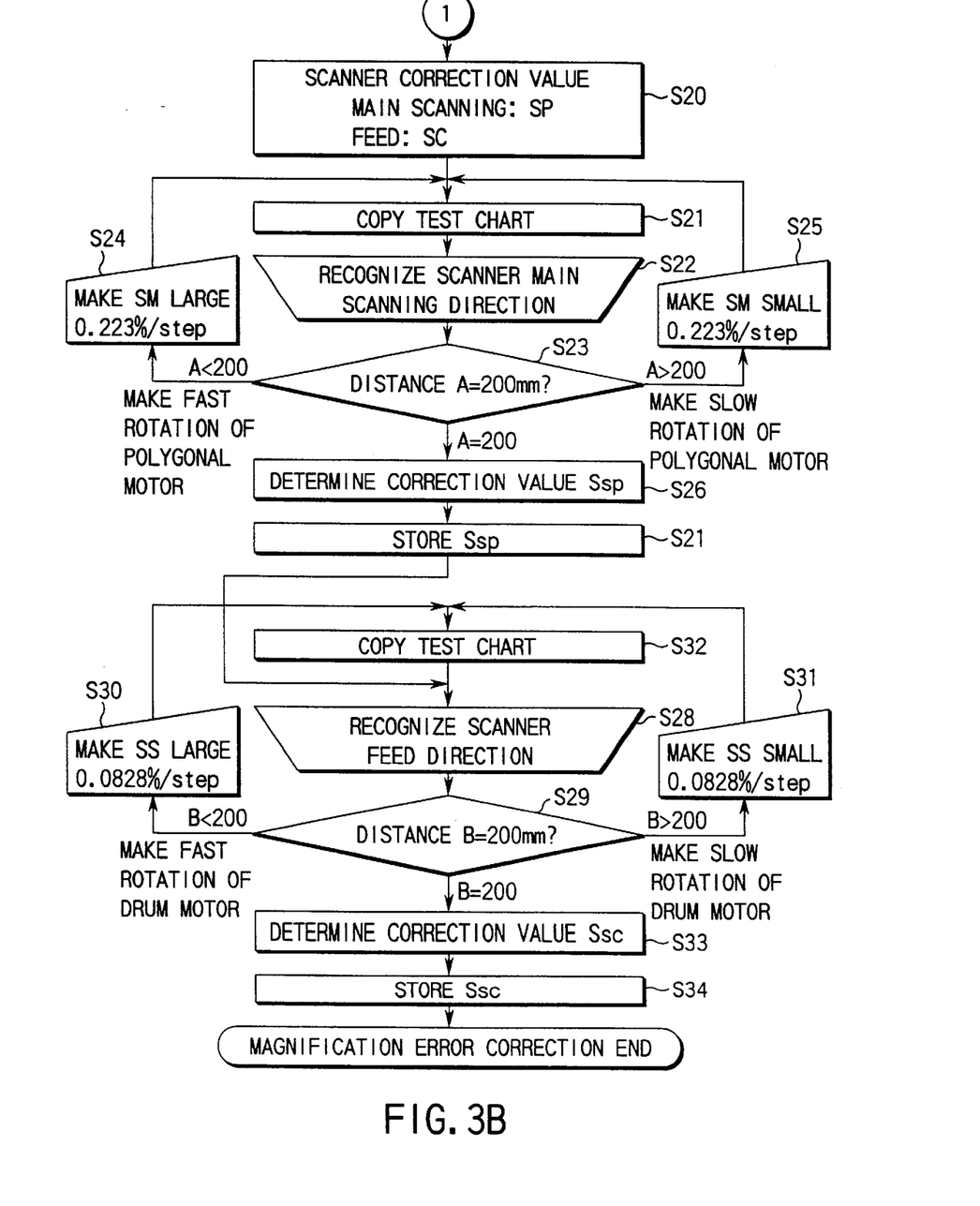

In the same manner as described above, when changing the rotational speed of the polygonal motor, a period of a horizontal synchronizing signal varies, and an image of the feed direction varies; as a result, an image magnification of the feed direction varies. For this reason, a correction of the rotational speed of the polygonal motor 8 is carried out before correction of the carriage motor.

Figure 5:
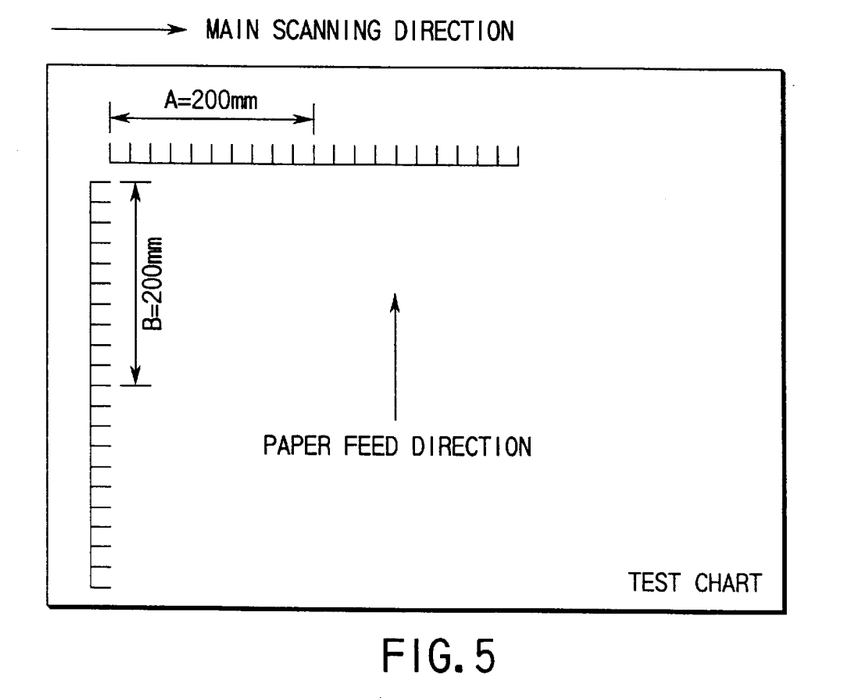
FIG. 5 is a diagram showing a test chart used in the magnification error correction method according to the present invention.

First, a test chart having a printed pattern as shown in FIG. 5 is copied (step S21). A main scanning direction length A of the printed pattern is measured by a scale or the like (step S22), and then, in accordance with an error, a proper correction value is input by the control panel 23 (steps S24 and S25). In this case, as described above, a rotational speed of the polygonal motor 8 has a change of 0.223% per correction one step value. In the case where a value of the distance A is smaller than 200 mm, a correction step value is increased; on the other hand, in the case where the distance A value is larger than 200 mm, the correction step value is decreased.

The input correction value is stored in an area "Msp" of the correction value storing memory 32, and then, the polygonal motor 8 is rotated according to a rotational speed corresponding to a new correction value. Further, the test chart is again copied, and then, is measured by a scale. The steps S21 to S25 are repeated until the error becomes least, and then, a final correction value Ssp (step) is obtained, and thereafter, the correction value Ssp is overwritten in the area "Msp" of the correction value storing memory 32 (step S27). The correction value Ssp is set as a second polygonal motor correction value.

A change rate Dsp of rotational speed after correction with respect to the rotational speed initial value PP of the polygonal motor shown in the above equation (2) is obtained by the following equation (3) using the first polygonal motor correction value Ssp.

$$Dsp=0.233\times Ssp/100 \quad (3)$$

Thus, the polygonal motor 8 after correction as scanner unit is rotated at a rotational speed SP' obtained by the following equation (4).

$$SP'=PP\,(1+Dsp) \quad (4)$$

Subsequently, a rotational speed of the carriage motor 7 is corrected. First, a feed direction of the copied pattern is recognized using the first polygonal motor corrected in steps S20 to S27 and the test chart as shown in FIG. 5 (step S28). More specifically, a distance B of the feed direction of the copied pattern is measured by a scale, and then, in accordance with an error, a proper correction value is input using the control panel 23 (steps S30 and S31). In this case, a rotational speed of the carriage motor 7 has a change of 0.0828% per correction value one step. In the case where the distance B is smaller than 200 mm, a correction step value is a positive value; on the other hand, in the case where the distance B value is larger than 200 mm, the correction step value is a negative value.

The input correction value is stored in an area "Msc" of the correction value storing memory 32, and then, the photosensitive drum 1 is rotated according to a rotational speed corresponding to a new correction value. Further, the test chart is again copied, and then, is measured by a scale. The steps S28 to S32 are repeated until the error becomes least, and then, a final correction value Ssc (step) is obtained, and thereafter, the correction value Ssc is overwritten in the area "Msc" of the correction value storing memory 32 (step S34).

When the CCD line sensor 25 scans a document image, for example, in the case where there is an error in a position of the lens 24 of FIG. 1, a main scanning direction magnification error takes place in an image data output from the CCD line sensor 25. In this case, the error is called as an optical magnification error. By the optical magnification error, a main scanning magnification error slightly differs in the case where the test chart is printed using the reference pattern generating unit 7 and in the case where the test chart is scanned by the scanner unit 30 and then, is printed.

In the correction of FIG. 3A, the magnification error of the printer unit 31 has been corrected. In the correction of FIG. 3B, the main scanning direction magnification error of the scanner unit 30 has been corrected using the printer unit 31 having no magnification error. The correction degree coincides with a difference between the first and second rotational speeds of the polygonal motor (exactly, difference between correction values).

Assuming that Sd is set as a difference between a correction value for compensating the main scanning direction magnification error relative to only printer, that is, the first polygonal motor correction value Spp and a correction value for compensating the main scanning direction magnification error relative to only scanner, that is, the second polygonal motor correction value Ssp, the difference Sd is expressed by the following equation (5).

$$Sd=Spp-Ssp \quad (5)$$

Thus, a value Dp showing the difference Sd by percentage is expressed by the following equation (6).

$$DP=(Spp-Ssp)0.233(\%) \quad (6)$$

The above Dp is a value showing an optical magnification error by percentage. More specifically, the rotational speed of the polygonal motor 8 is corrected to (1+DP/100) times in order to compensate the above optical magnification error.

Selection of Correction Values Corresponding to Various Print Modes

Figure 6:
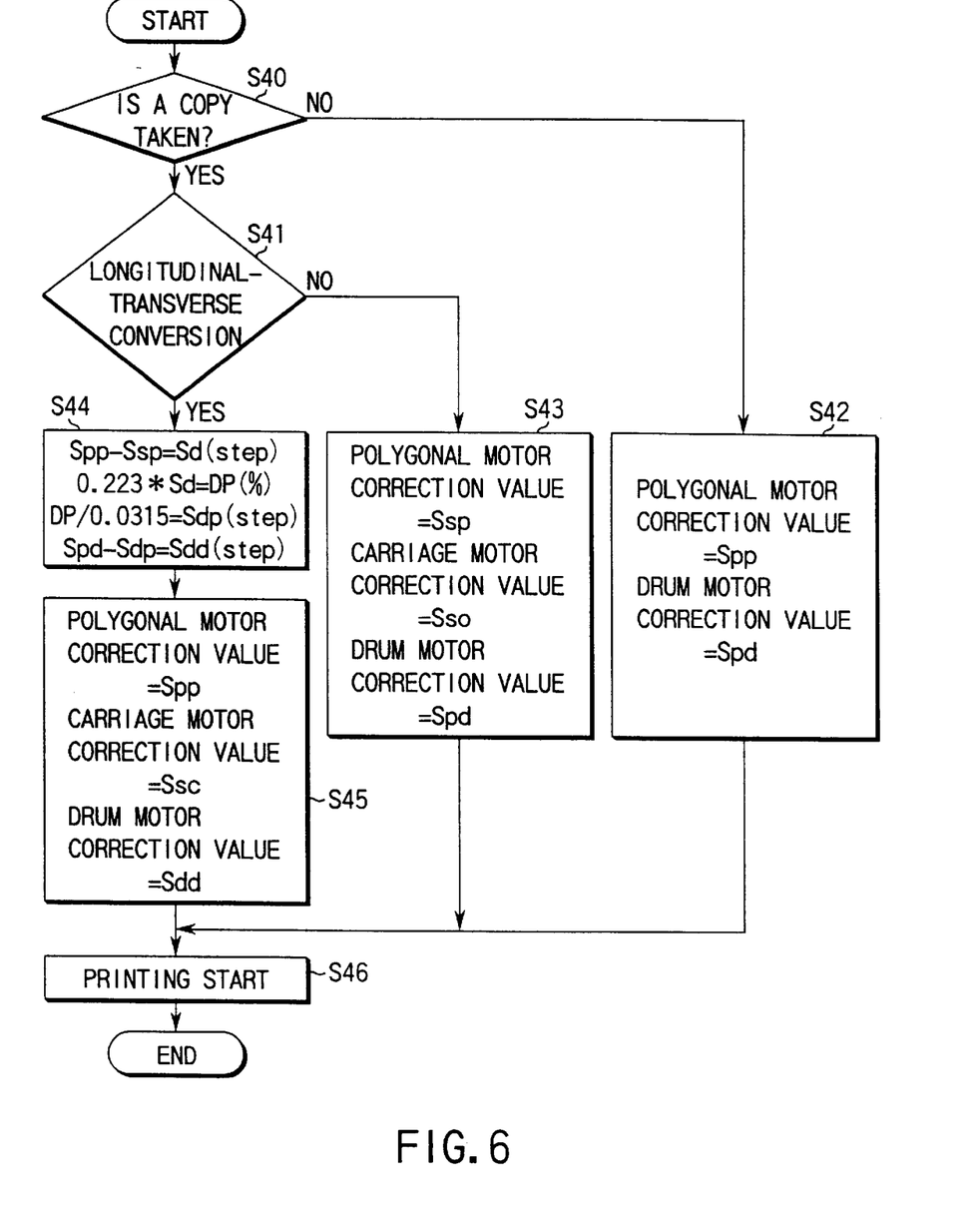
FIG. 6 is a flowchart to explain a magnification error correction method according to the present invention.

Next, a selection method of different correction values of various print modes will be described below with reference to a flowchart shown in FIG. 6.

(1) In the case of using only printer unit 31 of the image forming apparatus as a printer used for a personal computer or the like and a printer for outputting a received document of FAX, the correction values Spp and Spd obtained by the correction of the printer unit shown in FIG. 3A are used (step S42).

Polygonal motor correction value=Spp

Photosensitive drum motor correction value=Spd (2) In the case of outputting a copy image using the scanner unit 30 and the printer unit 31, the correction values Spd obtained by the correction of the printer unit shown in FIG. 3A and the correction values Scs and Sp corrected in steps S9 to S15 of FIG. 3B are used (step S43).

Drum motor correction value=Spd

Polygonal motor correction value=Ssp

Carriage motor correction value=Ssc (3) In the case of converting a main scanning/feed direction of an image scanned by the scanner into a feed/main scanning direction, and outputting the image (taking a copy), the feed direction of the document image is correctly captured in the image memory (without magnification error) by the carriage motor correction value Ssc shown in step S33 of FIG. 3B. In the case of converting the scanning/feed direction of the scanned image having no magnification error, and scanning the image to the main scanning direction on the basis of the rotational speed of the polygonal motor, it is possible to take a copy without magnification error using the first polygonal motor correction value Spp shown in step S7 of FIG. 3A.

Moreover, in the case of converting the scanning/feed direction of the image scanned by the scanner 30, and outputting the image by the printer 31, when the value Spd obtained in step S14 of FIG. 3A is used as a drum motor correction value, there is the case where an output image is greatly enlarged or shrunken to the feed direction. Because the aforesaid optical magnification error is reflected in an image formed on the photosensitive drum as a feed direction magnification error.

According to the present invention, the optical magnification error is compensated by correcting a rotation of the photosensitive drum. In order to compensate the optical magnification error by the rotational speed of the photosensitive drum, the Sd of the above equation (5) is used for a correction on the photosensitive drum. More specifically, a difference between the first polygonal motor correction value Spp and the polygonal motor correction value Ssp is calculated in step S44, and then, an optical magnification error Sd (step) is calculated.

Next, an error shown by a step value is converted into the error DP (%) shown by percentage using the above equation (6). In step S44, 0.223% is a change rate of the rotational speed of the polygonal motor per one step. Further, the DP(%) is converted into a correction step Sdp (step) of the photosensitive drum motor. In step S44, 0.0315% is a change rate of the rotational speed of the drum motor per one step. Finally, a correction value Sdd (step) of the photosensitive drum motor is calculated.

Thus, a correction value in the scanning/feed direction conversion of the image scanned by the scanner is as follows (step S45).

Polygonal motor correction value=Spp

Carriage motor correction value=Ssc

Drum motor correction value=Sdd

As is evident from the above description, according to the present invention, the magnification error correction is carried out by inputting a step value from the control panel of the image forming apparatus, and not by making a troublesome correction on the lens position in the scanner unit. Moreover, in a normally output image and in an image output in longitudinal-transverse conversion, it is possible to provide an image having no magnification error to a user both in the main scanning direction and in the feed direction.

Although the initial value of each motor correction value is set as "0" for convenience of explanation, in fact, the initial value may any other values, and not "0". For example, the following values may be used as a correction range.

Correction range of polygonal motor: 114 to 142 step (0.2230%/step)=±3%

Correction range of drum motor: 1 to 255 step (0.0315%/step)=±4%

Correction range of scanner motor: 0 to 255 step (0.0828%/step)=±1%

Further, a correction value of each motor is as follows.

(1) Correction value of printer unit (employed in an output by printer/FAX)

Photosensitive drum motor: 128

Polygonal motor: 128

(2) Correction value of scanner unit (employed when outputting an image scanned by the scanner)

Photosensitive drum motor: 128

Carriage motor: 128

| | |
|---|---|
| Polygonal motor: | 128 => 128 − 123 = 5 (step) |
| | 5 * 0.223 = 1.115(%) |
| | the rotational speed of the polygonal motor is made 1.115% slower than printer correction. |

(3) Correction value in normal copy

Polygonal motor: 128

Carriage motor: 128

Drum motor: 128

(4) Correction value in longitudinal-transverse conversion copy

Polygonal motor: 128

Carriage motor: 128

| | |
|---|---|
| Drum motor: | 92 ← the rotational speed of the polygonal motor is converted into a rotational speed of the drum motor |
| | 1.115/0.0315 = 35 (step) |
| | 128 − 35 = 92 (step) |

What is claimed is:

1. A magnification error correction method for an image forming apparatus including:

a printer unit which includes: a photosensitive drum motor which rotates a photosensitive drum having scanned surface and which is capable of correcting its rotational speed; and a polygonal motor which rotates a polygonal mirror scanning on the scanned surface of the photosensitive drum along a main scanning direction by a light beam, and which forms an image corresponding to an input image data;

a scanner unit which provides an image data corresponding to a document image and which includes: a line sensor scanning a document along a main scanning direction; and a carriage motor which drives a carriage that scans the document along a feed direction and which is capable of correcting its speed;

a control unit for inputting a motor correction value and displaying the motor correction value;

a reference pattern generating unit for generating a reference pattern data; and a memory for storing a correction value input by the control unit, comprising the steps of:

a first correction step of providing a first polygonal motor correction value and a first drum motor correction value to the polygonal motor and the photosensitive drum motor so that an image formed by the printer unit has a desired magnification, on the basis of the reference pattern data provided from the reference pattern generating unit, and storing these correction values in the memory;

a second correction step of scanning a document, on which a predetermined pattern is printed, by the scanner unit, providing a second polygonal motor correction value and a carriage motor correction value to the polygonal motor and the carriage motor so that an image printed using the printer unit has a desired magnification, storing these correction values in the memory, and providing the first drum motor correction value to the photosensitive drum motor; and a step of forming an image using the first polygonal motor correction value, the carriage motor correction value and a second drum motor correction value calculated from the first and second polygonal motor correction values and the first drum motor correction value in the case of scanning a document by the scanner unit, and forming an image by the printer unit in a state that a main scanning/feed direction of the image is inverted.

2. The magnification error correction method according to claim 1, wherein the first and second polygonal motor correction values are change rates of rotational speeds of the polygonal motor after completion of the first and second correction steps respectively, with respect to the rotational speed initial value of the polygonal motor, and the second drum motor correction value is calculated using a difference between the first and second polygonal motor correction values and the first drum motor correction value.

3. The magnification error correction method according to claim 1, wherein the first and second polygonal motor correction values are change rates of rotational speeds of the polygonal motor after completion of the first and second correction steps respectively, with respect to the rotational speed initial value of the polygonal motor, and the second drum motor correction value is a value calculated by subtracting a difference, obtained by subtracting the second polygonal motor correction value from the first polygonal motor correction value, from the first drum motor correction value.

4. The magnification error correction method according to claim 2, wherein the correction values are all expressed by a step value, and a rotational speed of each motor varies at a different predetermined change rate per step, and further, the second drum motor correction value is calculated using a difference between the first and second polygonal motor correction values, the first drum motor correction value, and a ratio of the change rates of the rotational speed of the polygonal motor and the drum motor per step.

5. An image forming apparatus comprising:

a printer unit which includes: a photosensitive drum motor which rotates a photosensitive drum having scanned surface and is capable of correcting its rotational speed; and a polygonal motor which rotates a polygonal mirror scanning on the scanned surface of the photosensitive drum along a main scanning direction by a light beam, and which forms an image corresponding to an input image data;

a scanner unit which includes: a line sensor scanning a document along a main scanning direction; and a carriage motor which drives a carriage scanning the document along a feed direction and is capable of correcting its speed, and which provides an image data corresponding to a document image;

a control unit for inputting a motor correction value and displaying the motor correction value;

a reference pattern generating unit for generating a reference pattern data;

a memory for storing a correction value input by the control unit, a first correction unit for providing a first polygonal motor correction value and a first drum motor correction value to the polygonal motor and the photosensitive drum motor so that an image formed by the printer unit has a desired magnification, on the basis of the reference pattern data provided from the reference pattern generating unit, and storing these correction values in the memory;

a second correction unit for scanning a document, on which a predetermined pattern is printed, by the scanner unit, providing a second polygonal motor correction value and a carriage motor correction value to the polygonal motor and the carriage motor so that an image printed using the printer unit has a desired magnification, storing these correction values in the memory, and providing the first drum motor correction value to the photosensitive drum motor; and a unit for forming an image using the first polygonal motor correction value, the carriage motor correction value and a second drum motor correction value calculated from the first and second polygonal motor correction values and the first drum motor correction value in the case of scanning a document by the scanner unit, and forming an image by the printer unit in a state that a main scanning/feed direction of the image is inverted.

6. The image forming apparatus according to claim 5, wherein the first and second polygonal motor correction values are change rates of rotational speeds of the polygonal motor after completion of corrections of the first and second correction units respectively, with respect to the rotational speed initial value of the polygonal motor, and the second drum motor correction value is calculated using a difference between the first and second polygonal motor correction values and the first drum motor correction value.

7. The image forming apparatus according to claim 5, wherein the first and second polygonal motor correction values are change rates of rotational speeds of the polygonal motor after completion of corrections of the first and second correction units respectively, with respect to the rotational speed initial value of the polygonal motor, and the second drum motor correction value is a value calculated by subtracting a difference, obtained by subtracting the second polygonal motor correction value from the first polygonal motor correction value, from the first drum motor correction value.

8. The image forming apparatus according to claim 6, wherein the correction values are all expressed by a step value, and a rotational speed of each motor varies at a different predetermined change rate per step, and further, the second drum motor correction value is calculated using a difference between the first and second polygonal motor correction values, the first drum motor correction value, and a ratio of the change rates of the rotational speed of the polygonal motor and the drum motor per step.

* * * * *